INVENTOR.
EDWARD G. ORTH
BY RONALD C. KAMP
ATTORNEY

United States Patent Office 3,338,329
Patented Aug. 29, 1967

3,338,329
STEERING
Edward G. Orth, Peoria, Ill., assignor to Westinghouse Air Brake Company, a corporation of Pennsylvania
Filed Dec. 1, 1964, Ser. No. 415,104
2 Claims. (Cl. 180—79.2)

The present invention relates generally to a hydraulic steering mechanism for articulated vehicles, and more particularly to articulated steering mechanisms capable of turning through at least 180 degrees.

Vehicles of the articulated type, i.e., those vehicles which do not utilize Ackerman steering, such as, for example, what is commonly referred to as a tractor-scraper, require at least 180 degrees of turn to provide the necessary maneuverability and control. Many steering mechanisms have been proposed in the past that provide such features, but these mechanisms have employed a combination of levers and links or gears. Use of levers, links or gears, and the resultant pivotal or rotational mounting therefor, increases not only the initial cost of manufacture, but also the amount of maintenance required in lubricating the bearing surfaces and replacing those that become worn. In addition, because of space limitations, the use of such components is often undesirable.

It is, therefore, an object of the present invention to provide a steering mechanism for an articulated vehicle which utilizes a minimum of load-carrying pivotal connections and is devoid of any linkage arrangement between the actuating jack and the vehicle.

It is another object of the present invention to provide a steering mechanism which effects a desirable steering effort or torque curve, and which is simple and relatively inexpensive to manufacture and maintain.

Figure 1:
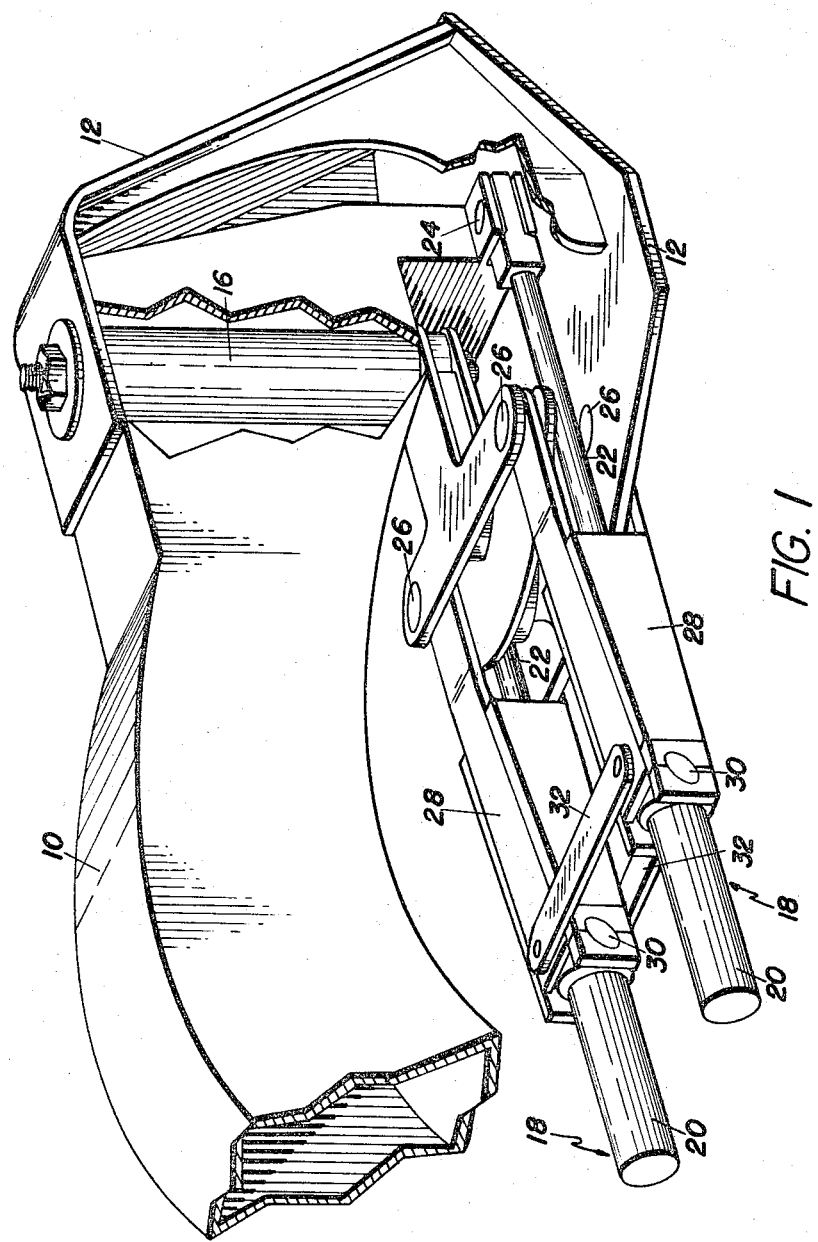
Figure 2:
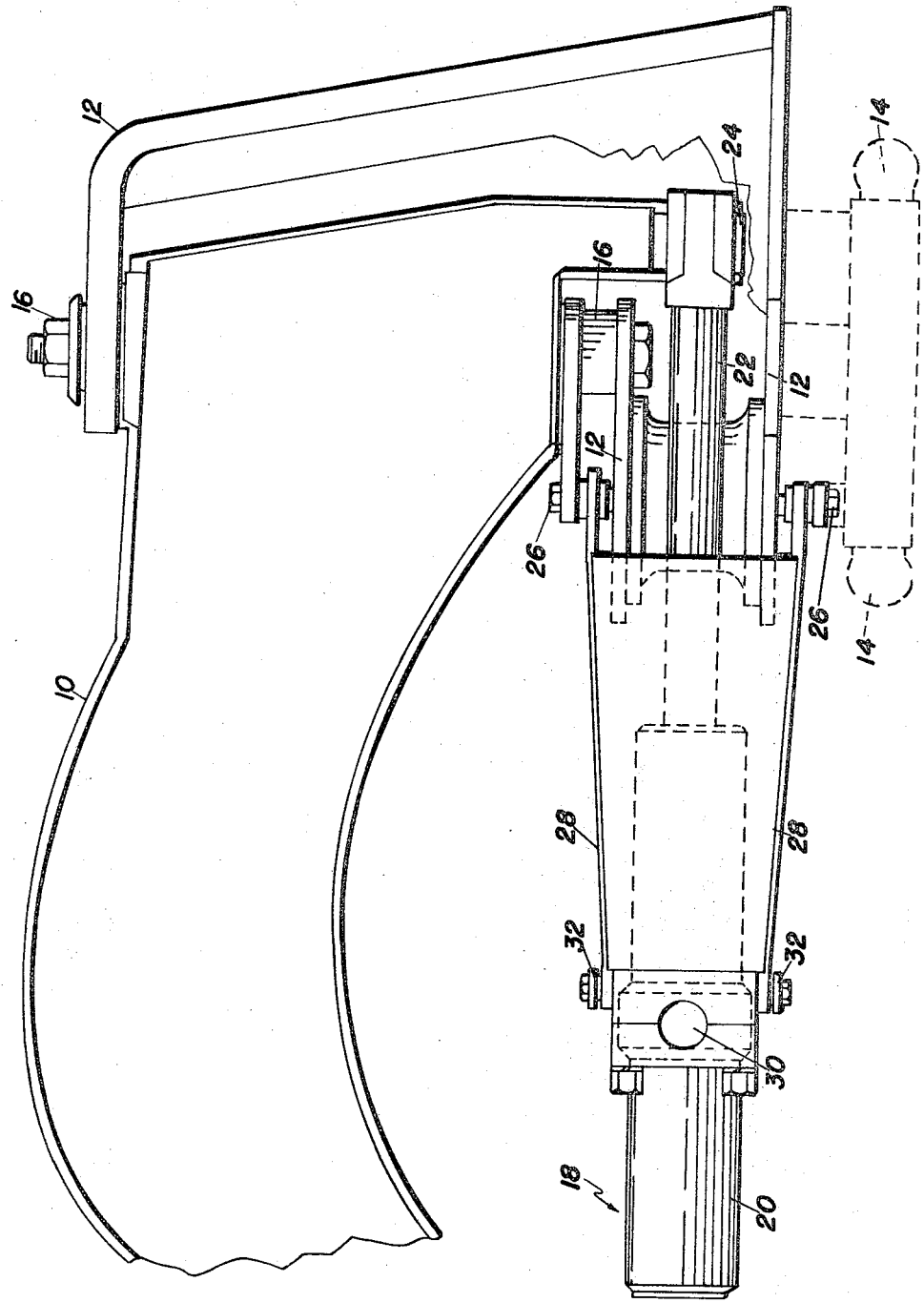
Figure 3:
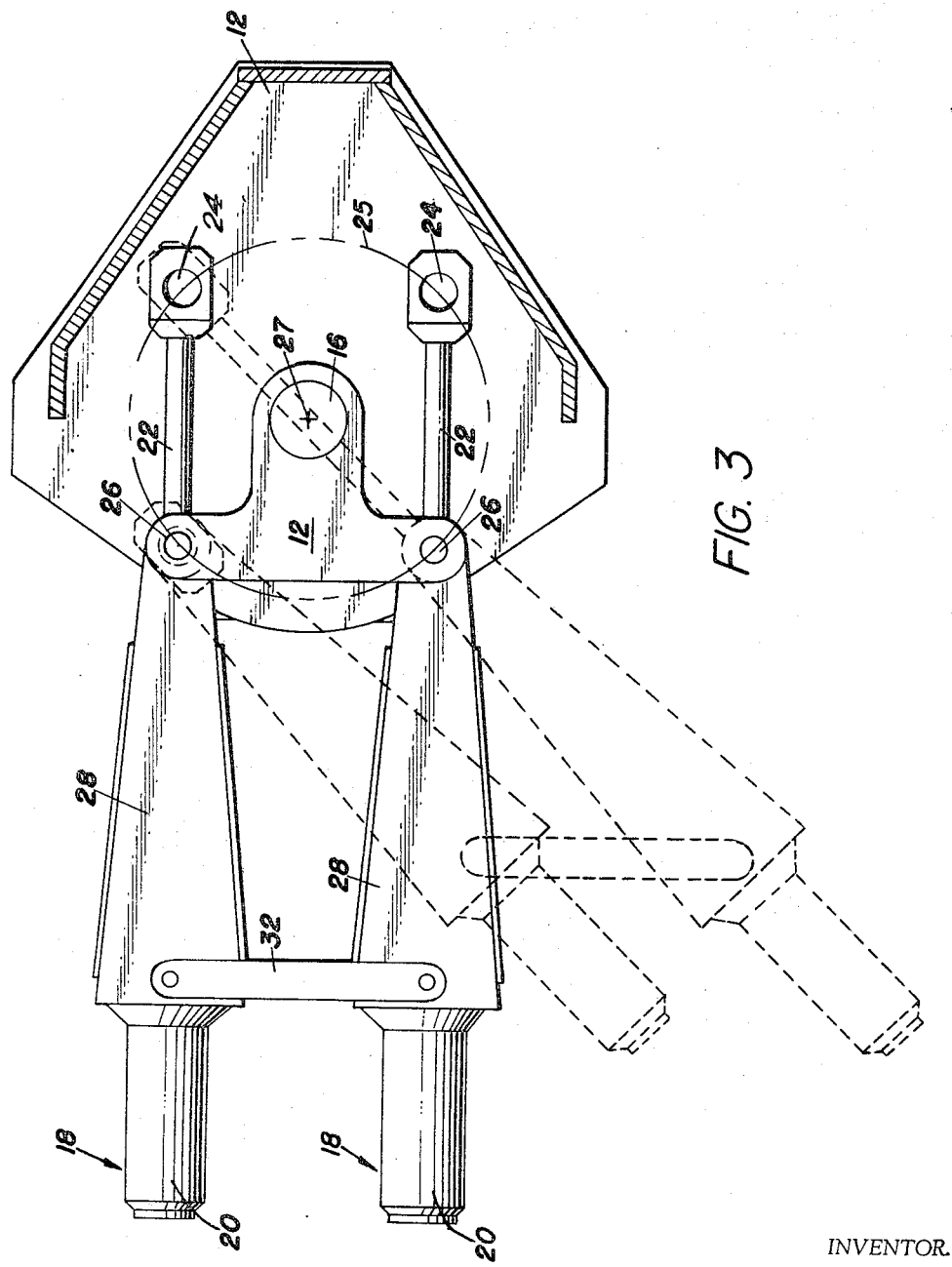
Figure 4:
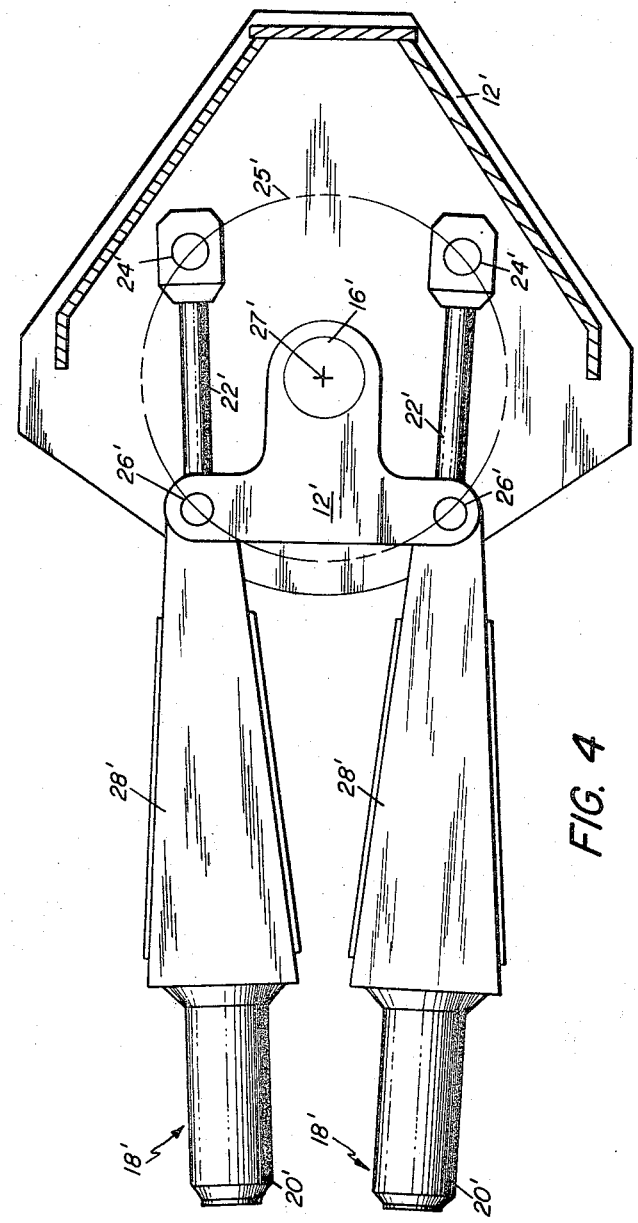

Other objects and many of the attendant advantages will become more readily apparent from a perusal of the following specification and the accompanying drawings, wherein:

FIG. 1 is an isometric view of a preferred embodiment of the present invention, showing the steering mechanism in relation to portions of the vehicle on which it is installed, FIG. 2 is a side elevational view with parts broken away for clarity, of the mechanism shown in FIG. 1, FIG. 3 is a top plan view, with parts omitted for clarity, showing a first embodiment of the steering mechanism with the vehicle in a straight ahead or aligned position, and showing in dotted lines the position of the steering mechanism when the vehicle is executing a 90 degree right turn, FIG. 4 is a top plan view, with parts omitted for clarity, showing a second embodiment of the steering mechanism with the vehicle in a straight ahead or aligned position.

Referring now to the drawings, there is shown in FIGS. 1 and 2 a portion of a goose neck 10 which is attached to the rear unit, e.g., a scraper. A hitch structure 12 is pivotally connected to the goose neck 10 by means of a king pin 16. The hitch structure 12 is secured to the front unit or tractor through a connector 14 which permits the tractor to oscillate about a longitudinal horizontal axis relative to the trailing unit. A pair of jacks 18 are provided, each of which has a cylinder 20 and a rod 22. The end of each rod 22 is pivotally attached to the goose neck 10 by means of a pivot pin 24. The cylinders 20 are pivotally attached to the hitch structure 12 by means of pivot pins 26 through an adaptor unit 28. To account for small misalignments the adaptor units 28 are secured to the cylinders 20 by means of pins 30. As can be seen best in FIG. 3 the pins 24 and 26 are positioned so that they all fall upon a circle 25 having its center 27 coincident with the center line of the king pin 16. The vehicle is turned by extending one jack and retracting the other. As the vehicle executes a 90 degree turn, the pin 24 of the extending jack will follow the arc of the circle and take the position formerly occupied by the pin 24 of the retracted jack. The retracted jack will have both pins 24 and 26 in axial alignment with each other. Because in this position the retracted jack is restrained at only one point, it will be free to assume any attitude with respect to the vehicle. To assure that the fully retracted jack will be properly oriented when it is required that this jack be extended, a link 32 is pivotally connected between the two adaptor units 28.

The torque curve provided by this arrangement is relatively flat in turning toward center or straight ahead position because the jack whose head end area is working has a maximum moment arm, i.e., the rod is tangent to the circle 25 and therefore at a maximum distance from the center of the king pin 16, while the other jack having zero moment arm is operating on its smaller rod end area. As the moment arm decreases on the extending jack, the moment arm upon which the retracting jack operates increases. The net result is a relatively uniform steering effort. In turning away from center, the extending jack, which has the largest working area, is acting at a distance which is rapidly approaching zero. Thus, the net torque drops slightly as the vehicle nears a full turn but this is not a disadvantage because the resistance to forward motion of the vehicle in an angled or partially turned attitude will tend to aid the steering effort.

It should be noted that in the embodiment shown the pins 24 and 26 are not only positioned in the circle 25 but are also equally spaced around this circle, i.e., each pin is located at an angle of 45 degrees from the longitudinal axis of the vehicle, and are, therefore, spaced 90 degrees from each other. In this arrangement, the cylinders 20 will remain substantially parallel to each other and the link 32 is necessary to maintain this parallel relationship when in a full 90 degree turn. If, as shown in FIG. 4, the pins 26 are located at less than 90 degrees apart, i.e., these pins are positioned on the circle 25 but closer together, then in a full 90 degree turn the pins 24 and 26 on the retracted jack will not be aligned and the links 32 will not be needed. In addition, if the initial spacing between jacks 18 is sufficient, the steering mechanism can turn more than 90 degrees in each direction. The cylinders 20 will not be parallel but will converge, and the steering effort will drop sharply after the 90 degree point has been passed. The reason for the drop in torque is due to the fact that the jack which is trying to extend will not be allowed to do so. The pin 24 must follow the circle 25 and therefore the extending jack is forced to retract. This is possible, even though the hydraulic pressure within the jack is trying to extend it, because the moment arm of the extended jack as very small while the moment arm of the retracting jack is nearly maximum. The difference between the torque effort of the retracting jack having a long moment arm and a small working area and the torque effort of the heretofore extending jack having a very short moment arm and a larger working area will be the net torque available for the steering effort. Thus, the steering effort will drop sharply after the vehicle has turned 90 degrees in either direction, but it will be possible to steer more than 180 degrees.

Thus it can be seen that the present invention provides an effective, though simple, arrangement for steering an articulated vehicle, and which has a minimum of load carrying pivotal connections. In addition, it provides a relatively constant steering effort in turning toward center or straight ahead position and nearly as efficient a steering effort when turning from the straight ahead position.

While there is in this application specifically described one form which the invention may assume in practice it will be understood that this form of the same is shown for purposes of illustration and that the invention may be modified and embodied in various other forms without departing from its spirit or the scope of the appended claims.

What is claimed is:

1. A steering mechanism for an articulated vehicle having pivotally connected front and rear units for relative angling about a common axis, said mechanism comprising:
   a pair of hydraulic cylinder means, each including a cylinder portion and a rod end;
   rod end pivot means including a first pair of pivot pins, each of which pivotally connects one of said rod ends to one of the units;
   cylinder pivot means including a second pair of pivot pins, each of which pivotally connects an end of one of said cylinder portions, adjacent a rod end, to the other of the units;
   all of said pivot pins positioned equidistant from said common axis;
   one of said pairs of said first and second pair of pivot pins being spaced closer together than the other of said pairs of said first and second pair of pivot pins;
   and each of said cylinder portions including an adapter, a cylinder, and horizontal pivot means pivotally connecting said cylinder to said adapter for pivotal movement about an axis transverse to the pivot axis of the associated pivot pin of said cylinder pivot means.

2. A steering mechanism for an articulated vehicle having pivotally interconnected front and rear units for relative angling through an arc of 180° about a common axis, said mechanism comprising:
   a pair of hydraulic cylinder means, each including a cylinder portion and a rod end;
   rod end pivot means including a first pair of pivot pins, each of which pivotally connects one of said rod ends to one of the units;
   cylinder pivot means including a second pair of pivot pins, each of which pivotally connects an end of one of said cylinder portions, adjacent a rod end, to the other of the units;
   a link pivotally connecting said cylinder portions;
   all of said pivot pins being located on and defining a circle having its center coincident with said common axis;
   each of said pins being spaced about said circle at intervals of 90° relative to the adjacent pins;
   and each of said cylinder portions including an adapter, a cylinder, and horizontal pivot means pivotally connecting said cylinder to said adapter for pivotal movement about an axis transverse to the pivot axis of the associated pivot pin of said cylinder pivot means.

References Cited
UNITED STATES PATENTS

| | | |
|---|---|---|
| 2,650,782 | 9/1953 | Fehring. |
| 2,922,237 | 1/1960 | Harrison et al. |
| 2,930,547 | 3/1960 | Hogan _____ 244—50 |

BENJAMIN HERSH, *Primary Examiner.*

MILTON BUCHLER, *Examiner.*

JAMES H. BRANNEN, *Assistant Examiner.*